United States Patent [19]

Ito

[11] Patent Number: 5,378,255
[45] Date of Patent: Jan. 3, 1995

[54] METHOD FOR MOLDING A GLASS OPTICAL ELEMENT WITH A TRANSPORTING SUPPORTING MEMBER

[75] Inventor: Hiroshi Ito, Hachiorji, Japan

[73] Assignee: Olympus Optical Company Limited, Japan

[21] Appl. No.: 20,649

[22] Filed: Feb. 22, 1993

[30] Foreign Application Priority Data

Feb. 21, 1992 [JP] Japan .................................. 4-072434

[51] Int. Cl.⁶ ........................ C03B 35/04; C03B 11/05
[52] U.S. Cl. .......................................... 65/64; 65/66; 65/361; 65/260; 65/226
[58] Field of Search ............... 65/361, 64, 260, 286, 65/305, 104, 106, 318, 320, 226, 66

[56] References Cited

U.S. PATENT DOCUMENTS 4,629,489 12/1986 Hirota .................................... 65/102
4,738,703 4/1988 Izumitani ............................... 65/104

FOREIGN PATENT DOCUMENTS 1006139 1/1986 Japan ...................................... 65/66
2056326 3/1987 Japan ...................................... 65/66

*Primary Examiner*—W. Gary Jones
*Assistant Examiner*—John Hoffmann
*Attorney, Agent, or Firm*—Bruce L. Adams; Van C. Wilks

[57] ABSTRACT

A method of molding a glass optical element. A supporting member is disposed in contact with a receiving mold part. A gob of molten glass is placed on an end surface of the receiving mold part and pre-molded by spreading out in contact with the end surface so as to form a glass preform. The glass preform supported by the supporting member is then transported to a heating furnace and heated. The heated glass preform supported on the supporting member is then transported to a position between a pair of mold parts and press molded to form a molded optical element. The end surface of the receiving mold part has a shape corresponding to an optical surface of the molded optical element so that in the pre-molding step, the glass preform is formed having a bottom portion having the shape corresponding to the optical surface. An auxiliary mold part can be provided having a molding surface in opposing facing relation with the end surface of the receiving mold part. The molding surface has a shape corresponding to another optical surface of the molded optical element, and the glass preform is formed having a top portion having the shape corresponding to the other optical surface of the molded optical element. By supporting the glass on the supporting member throughout the pre-molding operation, heating operation and press-molding operation, efficient mass production of optical elements is obtained.

19 Claims, 3 Drawing Sheets

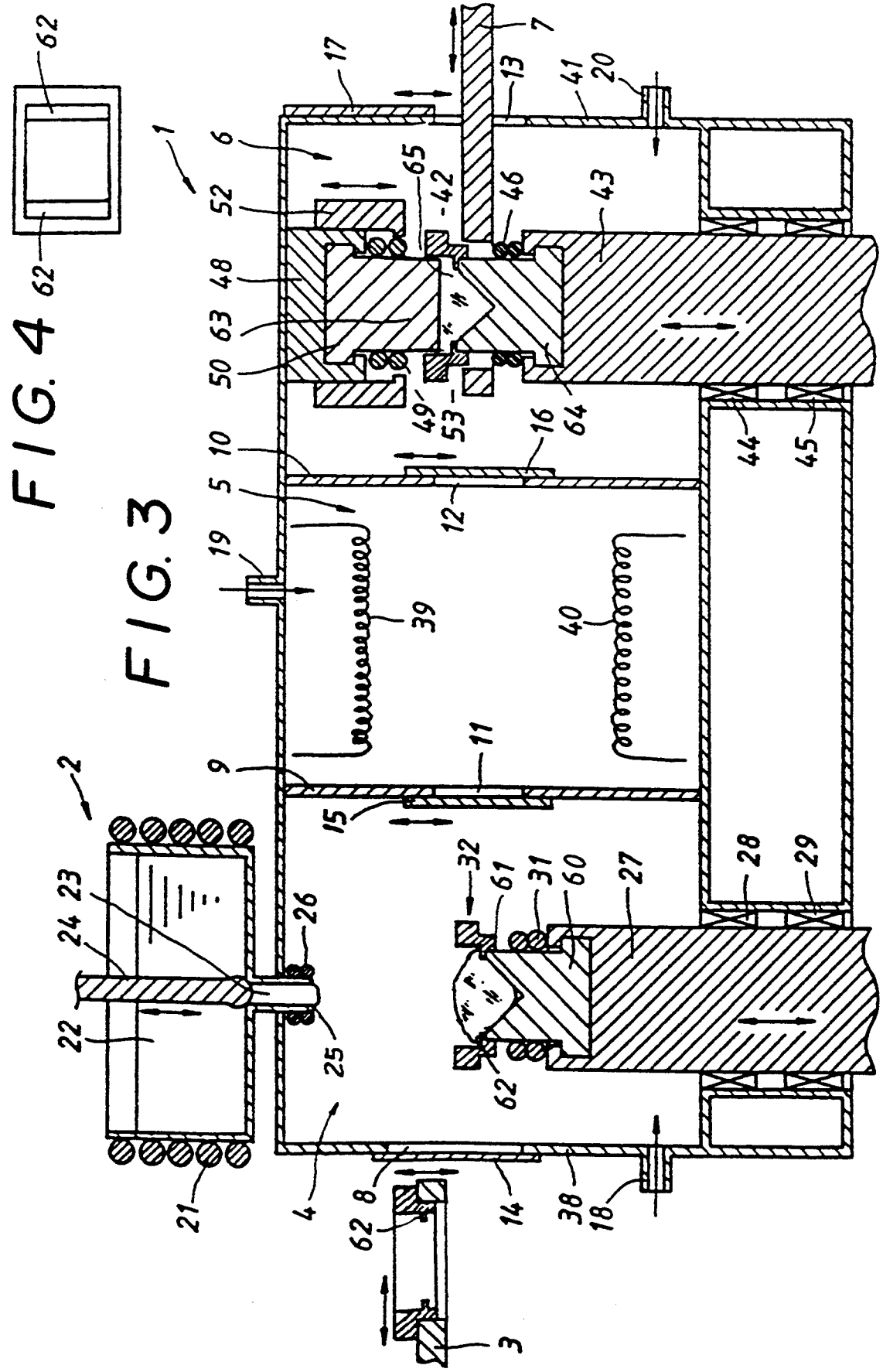

METHOD FOR MOLDING A GLASS OPTICAL ELEMENT WITH A TRANSPORTING SUPPORTING MEMBER

BACKGROUND OF THE INVENTION

1. Field of the Invention

This invention relates to a molding machine and a molding method for press-molding molten glass flowing out of a glass melting furnace to form glass optical element.

2. Description of the Related Art

Examples of the conventional methods for forming a glass optical element are Japanese Patent Laid-Open Publication No.3-45523 (hereinafter referred to as Publication 1), Japanese Patent Publication No.61-38130 (hereinafter referred to as Publication 2), Japanese Patent Publication No.63-37044 (hereinafter referred to as Publication 3), Japanese Patent Publication No.55-15420 (hereinafter referred to as Publication 4), Japanese Patent Publication No.3-72016 (hereinafter referred to as Publication 5), and the publication of U.S. Pat. No. 5,087,279 (hereinafter referred to as Publication 6).

The technical contents of these publications are as described below.

The following is the technical content described in Publication 1:

A method of manufacturing an optical glass element including:

(1) a step of receiving molten glass by a first heating jig;

(2) a step of transporting the molten glass by inverting the molten glass on a second heating jig while the molten glass is adhered to the second heating jig;

(3) a step of forming an optical glass molded piece by thermal deformation on the second heating jig; and (4) a step of heating and press-molding the optical glass molded piece by a pressing mold.

In this method, molten glass is received by the first heating jig maintained at a comparatively low temperature and is thereafter attached to the second heating jig and inverted. The optical glass is deformed by heat with its creased surface facing upward to remove a crease-like defect in the surface which has contacted the heating jig.

The following is the technical content described in Publication 2:

A method of molding a thick optical glass molded article by press molding including:

(1) molding a glass piece obtained by cutting a lump of molten glass by using a preliminary molding mold to obtain a preliminarily-molded glass piece;

(2) extracting this glass piece out of the preliminary molding mold by attracting an upper surface portion of the glass piece while a central portion of the glass piece is in a softened state;

(3) heating the glass piece so that glass piece has a viscosity such that it can be press-molded;

supplying the glass piece to a pressing mold by stopping the attraction; and (4) heating and press-molding the attracted surface of the glass piece.

According to this method, a glass piece can be molded in a state where the temperature of a central portion of the glass piece is substantially equal to or lower than the temperature of an outer peripheral portion, and is at a low temperature in a molding temperature range. It is thereby possible to obtain a molded article free from any sink mark and having an improved appearance.

The technical content described in Publication 3 resides in transporting a preform or glass molded piece between molding sections by supporting the molded piece on a ring-like barrel mold. That is, a glass transporting method is described in which sections for preheating, uniform heating, press molding, cooling and introduction/extraction are disposed concentrically, a pinching device provided at the center of the molding sections is rotated in a tact-rotation manner and extended and retracted in the direction of each section to successively transport preforms or glass molded pieces to form a pressed lens. In this method, a ring-like barrel mold serving as a barrel mold of a mold assembly for the press molding section and having in its outer circumferential surface a pinching portion in which the pinching device is inserted is moved with respect to the sections while internally supporting the preforms or press molded pieces.

The technical content described in Publication 4 is a method of supplying a deformable high-temperature glass piece to a lower mold part in a barrel mold to mold an optical element, wherein each one of a number of deformable heated glass pieces varying in volume is formed into a partially molded glass piece having an accurate predetermined volume to be continuously and efficiently molded into a molded piece having a complete predetermined shape.

The technical content described in Publication 5 is a method of molding an optical member including a step of preparing a glass solution, a step of controlling the temperature of a mold, a first pressing step of pressing the glass into an approximate shape having a predetermined thickness, and a second pressing step of pressing the glass while convergently controlling the mold temperature, and a glass cooling step.

The technical content of Publication 6 corresponds to the application filed as a combination of the application of the content of Publication 1 and other two applications (Japanese Patent Application Nos. 1-195061 and 1-280976), and is basically the same as the above-described technical content described in Publication 1.

There are problems described below with respect to the above-described conventional art.

With respect to Publication 1, the period of time through which the molten glass contacts the second heating jig, which is a lower mold part for molding into a finished shape is very long since thermal deformation is caused on the second heating jig. The molding cycle time is therefore long resulting in a low productivity in mass production. To improve the productivity, the production cost at an initial stage (initial cost) must be increased.

In the case of the method of Publication 2, in the step of extracting the glass piece from the preliminary molding mold by attracting an upper surface portion of the glass piece, the attracted surface is cooled by an attraction cylinder, so that the time taken to reheat the attracted surface is considerably long. A problem in terms of productivity is therefore encountered. Also, a defect in appearance can occur easily because of the method of directly attracting an optical surface.

In the transport method of Publication 3, a preform which is a solidified glass raw material is supplied to a supporting portion of the ring-like barrel mold. In the case of a method of obtaining a molded piece by using molten glass as a glass raw material, it is difficult to supply molten glass having a certain viscosity and to transport the same between the heating and molding sections.

In the method of Publication 4, pre-molding is performed on a first upper mold part and the molded piece is thereafter heated and is molded into an optical element on a second upper mold part. However, no means or step of separating the barrel mold and the lower mold is described.

In the method of Publication 5, pre-molding is performed before molding into an optical element so as to set a 1% or more thickness. However, the mold for the pre-molding is the same as that used to mold the optical element, and the pre-molded glass is not transported by any supporting member.

The method of Publication 6 entails substantially the same problem as the method of Publication 1.

SUMMARY OF THE INVENTION

In view of the above-described problems, an object of the present invention is to provide an apparatus and a method for molding a glass optical member which are designed to reduce the time through which a mold and molten glass contact each other and the time for heating a glass raw material so that the molded piece cycle time is reduced, whereby the productivity is improved while the production cost is reduced.

To achieve this object, according to one aspect of the present invention, there is provided an apparatus for molding a glass optical element, comprising a glass ejection chamber in which a predetermined amount of molten glass is ejected onto a receiving mold part and a supporting member detachably attached to an extreme end of the receiving mold part to be pre-molded, a reheating chamber provided adjacent to the glass ejection chamber and arranged to reheat the ejected glass separated from the receiving mold part and placed on the supporting member, a precision press chamber provided adjacent to the reheating chamber and arranged to mold the ejected glass reheated on the supporting member by placing the glass between a pair of upper and lower mold parts, and transport means arranged to transport the supporting member, the transport means including openings with opening/closing means provided between the precision press chamber, the reheating chamber and the glass ejection chamber.

According to another aspect of the present invention, there is provided a method of molding a glass optical element, comprising a pre-molding step of placing, on a receiving mold part having a molding surface formed in correspondence with one of functional surfaces of a molded lens, a supporting member having a step portion formed on its inner peripheral surface fitted to an outer peripheral surface of the receiving mold part, and ejecting and placing a predetermined amount of molten glass on the molding surface of the receiving mold part to mold the molten glass on the molding surface, a step of separating the receiving mold part and the supporting member and supporting the glass on the supporting member, a transport step of transporting the glass preformed by the pre-molding step to a position for a reheating step for heating the glass to a moldable temperature, the heating step for heating the glass transported by the transport step while the glass is supported on the supporting member, a transport step for transporting the supporting member on which the glass reheated by the reheating step is supported to a position between a pair of mold parts, and a precision pressing step of press-molding, with the pair of mold parts, the glass transported to the position between the pair of mold parts by the transport step.

In the above-described arrangement and method in accordance with the present invention, the molded article can be easily separated from the mold parts by being supported on the supporting member while preventing the optical surfaces of the ejected glass from contacting any other members during molding. Therefore, there is no possibility of an abrupt reduction in the temperature of the optical surfaces. Also, reheating and precision pressing of the ejection glass can be performed while the lower mold part is separated, and while the ejected glass is placed on a transport arm. Therefore the period of time between the pre-molding step and the precision pressing step can be reduced. Specifically, the pre-molding step for ejecting the next batch of molten glass can be performed during the time for the reheating step after the completion of the pre-molding step. Thus, glass articles can be manufactured in a mass production manner with a small number of mold parts, and it is possible to mold a glass optical element with improved cost performance and productivity.

The other features and advantages of the present invention will become apparent enough with the following explanation.

BRIEF DESCRIPTION OF THE DRAWINGS

FIG. 3 is a schematic longitudinal sectional view of an apparatus for molding a glass optical element in accordance with a third embodiment of the present invention; and FIG. 4 is a plan view of a supporting member used in the third embodiment.

DESCRIPTION OF THE PREFERRED EMBODIMENTS

An apparatus for molding a glass optical element in accordance with an embodiment of the present invention will be described below with reference to the accompanying drawings.

Figure 1:
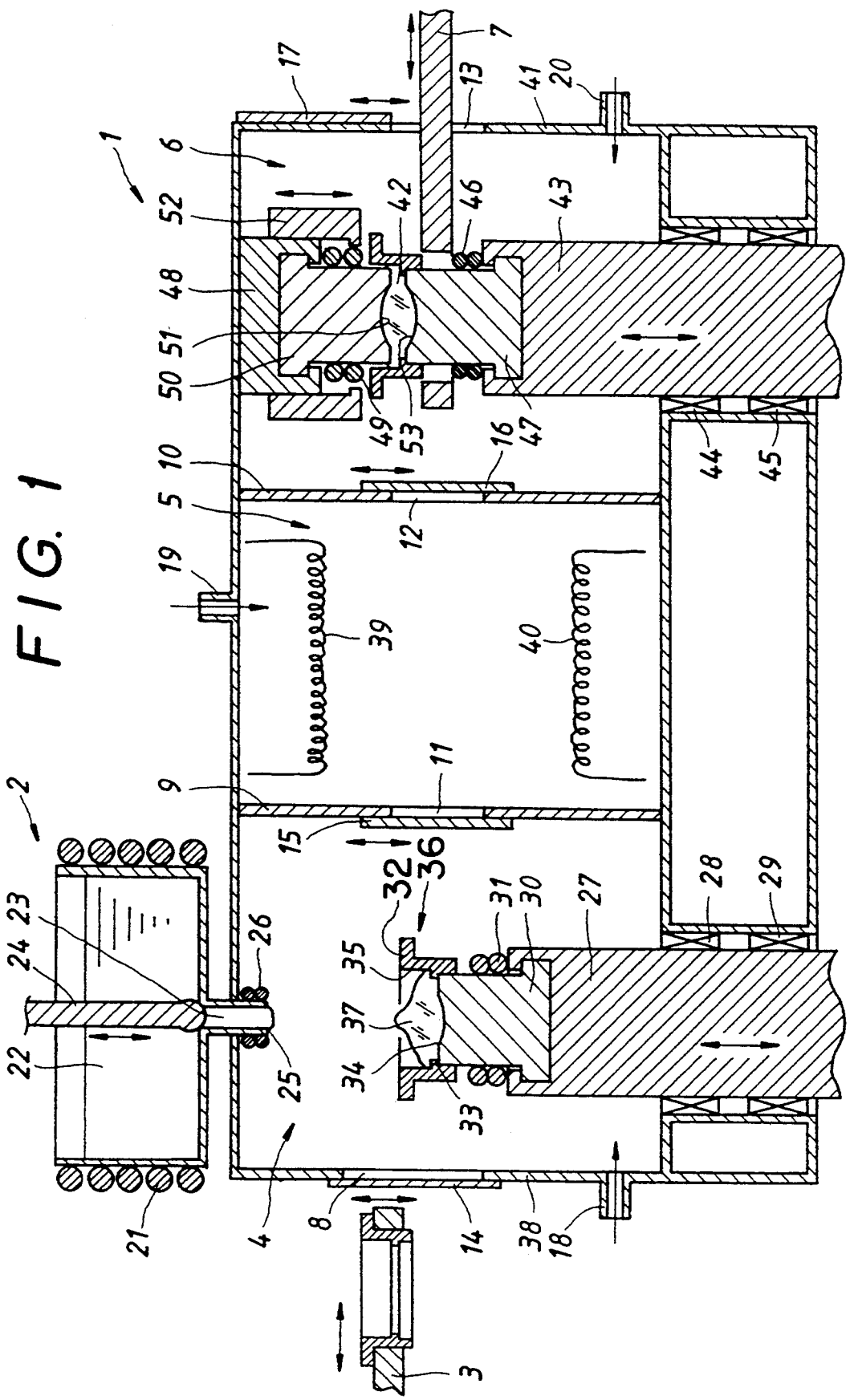
FIG. 1 is a schematic sectional side view of an apparatus for molding a glass optical element in accordance with a first embodiment of the present invention.

FIG. 1 is a schematic sectional side view of an apparatus 1 for molding a glass optical element in accordance with the first embodiment of the present invention.

As illustrated, the apparatus 1 for manufacturing a glass optical element in accordance with the first embodiment has several main portions, i.e., a glass ejection chamber 4 forming a left end portion of the apparatus and disposed below a glass melting furnace 2, a reheating chamber 5 provided adjacent to the glass ejection chamber 4 on the right-hand side with a partition wall 10 interposed therebetween, a precision press chamber 6 provided adjacent to the reheating chamber 5 with a partition wall 10 interposed therebetween, a flat supporting member supply arm 3 provided on the outside of a left side wall of the left-hand side of the glass ejection chamber 4 and arranged to transport a supporting member 36 into the glass ejection chamber 4, and a flat transport arm 7 provided on the outside of a right side wall 41 of the precision press chamber 6 and arranged for transportation through each chamber.

The glass melting furnace 2, disposed above the glass ejection chamber 4 and having a tub-like shape, is formed continuously with a nozzle 25 for supplying molten glass 22 to the interior of the glass ejection chamber 4. The molten glass is supplied through an ejection hole 23 formed in a bottom surface of the glass melting furnace 2 at the center thereof and through a hole formed in an upper wall surface of the glass ejection chamber 4. A heater 21 for melting a raw glass material introduced into the glass melting furnace 2 is wound around an outer circumferential surface of the glass melting furnace 2. The temperature at which the molten glass 22 is heated is controlled to a predetermined temperature.

A plunger 24 is arranged above the ejection hole 23 (nozzle 25) formed in the bottom surface of the glass melting furnace 2 so as to be able to move vertically. The plunger 24 has a cylindrical or pestle-like shape such as to be able to open and close the hole 23 by its extreme end portion. A base end portion of the plunger 24 is connected to a drive means (not shown) provided above the glass melting furnace 2. That is, the plunger 24 is moved in a vertical direction to open or close the ejection hole 23 to control the rate at which the molten glass 22 is ejected. A heater 26 for constantly maintaining the molten glass 22 at a predetermined temperature is also wound around an outer circumferential surface of the nozzle 25.

In the glass ejection chamber 4 provided below the glass melting furnace 2, a cylindrical column or shaft 27 is disposed so as to stand upright in a position right below the nozzle 25 of the glass melting furnace 2. The shaft 27 can be moved vertically by a drive means (not shown) through bearings 28 and 29. A detachable cylindrical receiving mold part 30 having an outer circumferential surface around which a heater 31 is wound is provided on an upper end surface of the shaft 27.

An upper end portion of the receiving mold part 30 is formed so as to detachably receive the annular supporting member 36 transported by the supporting member supply arm 3 described later.

An opening 8 through which the supporting member supply arm 3 for introducing the supporting member 36 from the outside can enter the glass ejection chamber 4 is formed in a side wall 38 of the glass ejection chamber 4 at an intermediate position, i.e., at a position such as to laterally face a side of an upper end surface of the receiving mold part 30. A shutter 14 arranged so as to be movable as indicated by arrows in FIG. 1 by an opening/closing means with a drive source, e.g., an air cylinder is provided on an outer wall portion in the vicinity of the opening 8. An extreme end portion of the supporting member supply transport arm 3 for transporting the supporting member 36 onto the receiving mold part 30 in the glass ejection chamber 4 by moving through the opening 8 is formed so as to have a U-shaped recess having a shape and a size corresponding to those of an outer circumferential surface of the supporting member 36 such that the supporting member 36 can be transported by being fittingly placed in the arm 3.

The annular supporting member 36, formed so as to be fitted to the supporting member supply arm 3 and the receiving mold part 30, has a flange 32 defining its outer end circumferential surface. An inner circumferential surface of the supporting member 36 is formed to have an inside diameter corresponding to an outside size of the glass optical element to be molded. A step portion 33 is also formed on the inner circumferential surface 35 at an intermediate portion so as to project to an extent such as to avoid interference with an approximately-formed surface of the molded glass optical element formed on an upper end surface 34 of the receiving mold part 30. A fitting portion is formed as a lower end surface of the step portion 33 so as to have a size corresponding to an outside size of the receiving mold part 30.

The upper end surface 34 of the receiving mold part 30 is formed as a surface approximated to the surface of the molded glass optical element having a finished shape. Also, tube upper end surface 34 is coated with a thin film of a material, such as CrN, $Cr_2O_3$, TiN, c—BN, h—BN, w—BN or AlN, low in wettability with respect to the molten glass, to prevent fuse-bonding with the molten glass. This coating can be formed to have a thickness of 0.1 to 1 $\mu$m by the PVD method, and can be formed to have a thickness on the order of several hundred $\mu$m by the CVD method.

In the glass ejection chamber 4, the desired airtightness and the desired temperature of the atmosphere is maintained by the shutter 14 provided at the opening 8 formed in the side wall 38 and vertically slidable as indicated by arrows in FIG. 1. That is, the shutter capable of opening and closing is controlled by a control means (not shown) so as to be opened immediately before the supporting member 36 placed on the supporting member supply arm 3 is introduced into the glass ejection chamber 4, and so as to be closed when the arm 3 recedes out of the side wall 38 to the home position after the supporting member 36 has been fitted on the receiving mold part 30.

A gas inlet port 18 connected to a glass supply means (not shown) provided outside is formed in the side wall 38 of the glass ejection chamber 4 at a lower position to introduce a non-oxidizing gas such as nitrogen gas for maintaining a non-oxidizing atmosphere in the chamber 4.

An opening 11 formed in the same manner as the opening 8 formed in the side wall 38 of the glass ejection chamber 4 is formed in the partition wall 9 of the adjacent chamber, i.e., the reheating chamber 5, opposite to the side wall 30 of the glass ejection chamber 4 at generally the same level as the upper end surface 34 of the receiving mold part 30. The desired airtightness and the desired temperature of the atmosphere in the reheating chamber is maintained by a shutter 15 provided at the opening 11 and operated as indicated by arrows in FIG. 1. The shutter 15 is opened immediately before the transport arm 7 described later reaches the partition wall 9 after passing through the precision press chamber 6 and the reheating chamber 5, and which is closed when the transport arm 7 receiving the supporting member 36 is returned to a position in the reheating chamber 5.

An opening 12 and a shutter 16 which are the same as the opening 11 and the shutter 15 at the partition wall 9 are also provided at the partition wall 10 provided between the reheating chamber 5 and the precision press chamber 6. That is, the opening 12 is formed in the partition wall 10 at a position corresponding to the opening 11 in the partition wall 9, and the shutter 16 controlled so as to open or close the opening 12 is arranged so as to be vertically movable as indicated by arrows in FIG. 1.

In an upper wall of the reheating chamber 5 arranged to maintain the desired airtightness and the desired atmosphere temperature as described above, a gas inlet port 19, which is the same as the gas inlet port 18 of the glass ejection chamber 4, is also formed to introduce a non-oxidizing gas such as nitrogen gas into the reheating chamber 5.

Heaters 39 and 40 are provided at respective positions in upper (ceiling) and lower (bottom) sections of the reheating chamber 5 to reheat ejected glass 37 in the supporting member 36 transported by the transport arm 7 through holes of the supporting member 36 facing upward and downward to a predetermined temperature. The energization of the heaters 39 and 40 is controlled by a temperature sensor and a temperature controlled (not shown) to maintain a predetermined heating temperature.

An opening 13 and a shutter 17 which are the same as the opening 12 and the shutter 16 at the partition wall 10 are also provided at the same positions at the outer side wall 41 of the precision press chamber 6 opposite to the partition wall 10 provided between the adjacent reheating chamber 5 and the precision press chamber 6. The transport arm 7 is arranged so as to be able to move into and out of the precision press chamber 6 to transport a molded article (molded lens) 42 to the outside of the machine through the opening 13.

An upper mold part 50 is provided in the precision press chamber 6 constructed as described above at a position close to a central portion of an upper wall thereof by being supported by a mount 48. The upper mold part 50 is formed so as to have a cylindrical shape such that its base end portion is fitted to a lower end surface of the mount 48. A heater 49 for controlling the mold temperature so as to maintain the same at a predetermined temperature is wound around an outer circumferential surface of the upper mold part 50. An end surface (molding surface) 51 of the upper mold part 50 is accurately formed so as to have a shape corresponding to a finished shape of the molded lens 42. The molding surface 51 is coated with a thin film of a material, such as CrN, $Cr_2O_3$, TiN, c—BN, h—BN, w—BN or AlN, low in wettability with respect to the glass heated and softened, to prevent fuse-bonding with the glass heated and softened. This coating can be formed to have a thickness of 0.1 to 1 $\mu$m by the PVD method, and can be formed to have a thickness on the order of several hundred $\mu$m by the CVD method.

An annular mold release member 52 is fitted around an outer circumferential surface of the mount 48 on which the upper mold part 50 is mounted. The mold release member can be vertically slid on the mount 48 by a drive means (not shown) (as indicated by arrows in FIG. 1). A projection is formed on an extreme end (lower end) portion of the mold release member 52 at an inner circumferential end thereof so that its extreme end surface can be brought into abutment against the flange 32 of the supporting member 36 when the mold release member 52 is slid downward.

The mold release member 52 is automatically controlled in such a manner that it starts moving downward substantially simultaneously with the downward movement of a lower mold part 47 when the molded lens 42 is molded in the mold, and that its extreme end surface is brought into abutment against the upper surface of the flange 32 to press the same so as to separate the molding surface 51 of the upper mold part 50 and an optical surface (functional surface) in the upper surface of the molded lens 42 from each other. The molded lens 42 separated from the mold part falls onto the transport arm 7 together with the supporting member 36.

A cylindrical column or shaft 43 is disposed so as to stand upright in a lower position such as to face the molding surface (end surface) 51 of the upper mold part 50, that is, it is coaxially opposed to the upper mold part 50 from below. Bearings 44 and 45 are provided between a base end portion of the shaft 43 and a base, and the shaft 43 can be vertically moved by a drive means (not shown) as indicated by arrows. The lower mold part 47 having a cylindrical shape and having an outer circumferential surface around which a heater 46 controlled to maintain a predetermined mold temperature is wound is detachably attached to an upper end portion of the shaft 43. An upper end surface 53 of the lower mold part 47 is accurately formed so as to have a shape corresponding to the finished shape of the molded lens 42 and to apply a predetermined pressing force to the ejected glass 37 in the supporting member 36 while the glass 37 is pinched between the upper and lower mold parts. The upper end surface 53 is coated with a thin film of a material, such as CrN, $Cr_2O_3$, TiN, c—BN, h—BN, w—BN or AlN, low in wettability with respect to the glass heated and softened, to prevent fuse-bonding with the glass heated and softened. This coating can be formed to have a thickness of 0.1 to 1 $\mu$m by the PVD method, and can be formed to have a thickness on the order of several hundred $\mu$m by the CVD method.

A gas inlet port 20, which is the same as the gas inlet ports of the glass ejection chamber 4 and the reheating chamber 5, is also formed in a lower portion of the side wall of the precision press chamber 6 to introduce a non-oxidizing gas such as nitrogen gas into the chamber 6.

As illustrated, while the supporting member supply arm 3, disposed outside the opening 8 of the side wall 38 of the glass ejection chamber 4, having a flat elongated shape and having its base end portion connected to the unillustrated drive means, is controlled and arranged to move for transportation of the supporting member 36 onto the receiving mold part 30 in the glass ejection chamber 4 and to return to the home position after the transportation, the transport arm 7, disposed outside the opening 13 of the side wall 41 of the precision press chamber 6, having a flat elongated shape and having its base end portion connected to the unillustrated drive means, is controlled and arranged to enter the precision press chamber 6, the reheating chamber 5 and the glass ejection chamber 4 through the openings 13, 12, and 11 formed in the side wall 41 and the partition walls 10 and 9.

The transport arm 7 has, like the supporting member supply arm 3, a U-shaped supporting member mount portion formed in its extreme end portion so as to have a size corresponding to the outside diameter of the supporting member 36. The supporting member 36 which is mounted on the receiving mold part 30 in the glass ejection chamber and on which molten ejected glass 37 is placed is mounted on the transport arm 7 and is transported into the heating furnace of the reheating chamber 5 having the heaters 39 and 40 to heat the glass from the upper and lower sides of the transport arm 7.

The ejected glass 37 transported into the reheating chamber 5 and heated to the predetermined temperature is transported to a position located above the lower mold part 47 in the adjacent precision press chamber 6 through the opening 12. The lower mold part 47 is moved upward by the operation of the drive means through the shaft 43 from below toward the supporting member 36 which has been transported to the position above the lower mold part 47 and on which the ejected glass 37 is placed. The upper end surface of the lower mold part 47 is thereby brought into engagement with the step portion 33 of the supporting member 36 to lift the supporting member 36 from the transport arm 7, and the glass is pressed and molded between the lower mold part 47 and the upper mold part 50. During the molding, the transport arm 7 stays between the mold parts holding the supporting member 36, and only the supporting member 36 is lifted by the lower mold part to press and mold the ejected glass 37 between the upper end surface of the lower mold part 47 and the molding surface 51 of the upper mold part 50.

After being molded by the upper and lower mold parts 50 and 47, the supporting member 36 and the molded lens 42 are released from the mold parts by the downward movements of the lower mold part 47 and the mold release member 52 to fall onto the transport arm 7.

The transport arm 7 on which the supporting member 36 is mounted is moved again to the outside through the opening 13.

In the above-described process, the mold release member 52 fitted around the upper mold part 50 is located at a position such that it does not contact the supporting member 36, as illustrated. The mold release member 52 is moved downward subsequently to the downward movement of the lower mold part 47 after the completion of pressing. In a case where the molded lens 42 is adhering to the upper mold part, the mold release part 52 is brought into abutment against the upper surface of the flange 32 of the supporting member 36 to separate the molded lens 42 from the upper mold part, and the supporting member 36 and the molded lens 42 are then received by the extreme end portion of the transport arm 7. In a case where the molded lens 42 is adhering to the lower mold part 47, the flange 32 of the supporting member 36 is brought into abutment against the transport arm 7 and the lower mold part 47 is further moved downward to separate the molded lens 42.

The supporting member 36 and the molded lens 42 released from the mold and placed in the extreme end portion of the transport arm 7 are transported to the outside of the molding machine 1 by the transport arm 7, and the molded lens 42 is thereafter cooled slowly if necessary.

An example of a manufacturing process using the above-described molding machine in accordance with this embodiment will be described below.

In this example, SF optical glass is used to mold a biconvex lens having an outside diameter of 15 mm, a thickness of 3 mm, and curvatures of 25 mm and 40 mm.

First, nitrogen gas is introduced into the glass ejection chamber 4, the reheating chamber 5 and the precision press chamber 6 through the gas inlet ports 18, 19, and 20 to maintain a non-oxidizing atmosphere in the molding machine 1. Then, an SF glass raw material placed in the glass melting furnace 2 is heated by the heater 21 to be melted until the viscosity of the glass becomes 103 poise.

Also, the receiving mold part 30 in the ejection chamber 4 is previously heated and maintained at a temperature (400° C.) lower than the glass transition point (450° C.) by the heater 31 and the control means.

Next, the supporting member supply arm 3 on which the supporting member 36 is mounted is moved through the opening 8 of the side wall 38 and is stopped above the receiving mold part 30 in the glass ejection chamber 4. The receiving mold part 30 is moved upward by the shaft 27 to fit the upper end of the receiving mold part 30 to the lower end of the supporting member 36 so that the supporting member 36 is placed on the receiving mold part 30. A predetermined amount of molten glass 22 is ejected onto the supporting member 36 and the upper end surface 34 of the receiving mold part 30 by lifting the plunger 24 provided in the glass melting furnace 2, thereby starting a pre-molding step.

The supporting member supply arm 3 operated to transport and place the supporting member 36 on the receiving mold part 30 in the glass ejection chamber 4 in the above-described operating process recedes out of the glass ejection chamber 4 through the opening 8 to prepare for the transportation and placement of the next supporting member 36, thereby completing the step of supplying and transporting the supporting member 36.

In the pre-molding step, ejected glass 37 ejected onto the receiving mold part 30 and the supporting member 36 spreads out gradually at the center of the upper end surface 34 of the receiving mold part 30 by its weight while being slowly cooled in the receiving mold part 30. At this time, a surface portion of the ejected glass is cooled comparatively abruptly, and the flowability of the glass is accurately reduced. Therefore, the glass surface is heated again to be softened. In this example, when the ejection of the ejected glass 37 onto the supporting member 36 and the receiving mold part 30 is completed, the transport arm 7 disposed outside the side wall 41 is operated to enter the glass ejection chamber 4 by moving through the opening 13 and the opening 12 of the precision press chamber 12 and the opening 11 of the reheating chamber 5 and is stopped below the flange 32 of the supporting member 36. After the ejected glass 37 inside the inner circumferential surface 35 of the supporting member 36 has contacted the step portion 33 and the inner circumferential surface 35 while spreading out, the shaft 27 is moved downward so that the ejected glass 37 is caught by the step portion 33 of the supporting member 36. Also, the flange 32 of the supporting member 36 is brought into abutment against the transport arm 7 to release the ejected glass from the receiving mold part 30, thereby completing the pre-molding step.

The transport member 7 having on its extreme end portion the supporting member 30 on which the ejected glass 37 is placed is transported into the heating furnace of the reheating chamber 5 through the opening 11 to perform heating in a reheating step. Preferably, the ejected glass 37 on the supporting member 36 at this time has a viscosity of $10^7$ poise or higher, so that the ejected glass 37 is not easily deformed by its weight during the mold release and transportation.

The ejected glass 37 on the supporting member 36 transported into the reheating chamber 5 is reheated by the heaters 39 and 40 through the holes of the supporting member 36 facing upward and downward until the predetermined temperature is reached, for example, to set the glass viscosity to $10^6$ to $10^{8.5}$ poise, thereby completing the reheating step. In this case, heating is performed while the supporting member 36 in which the ejected glass 37 is set is placed on the transport arm 7.

A surface portion of the ejected glass 37 abruptly cooled in the pre-molding step is heated for a short time to obtain the desired flowability for molding. That is, it is preferable to perform the reheating rapidly for a short time because the surface heating temperature is thereby made comparatively higher.

The transport arm 7 is operated to transport the ejected glass (pre-molded glass) 37 on the supported member 36 heated to a moldable temperature in the reheating step into the precision press chamber 6 for the next step, i.e., a precision pressing step. The supporting member 36 and the pre-molded glass 37 are thereby moved into the precision press chamber through the opening 12 and are stopped when interposed between the pair of upper and lower mold parts.

While this operation is performed, the temperature to the upper and lower mold parts 50 and 47 is previously controlled so as to be constantly maintained at a temperature close to the glass transition point, e.g., 450° C. Subsequently, the lower mold 47 is moved upward by the shaft 43. The extreme end portion of the lower mold part 47 is thereby inserted in a lower end section of the cylindrical cavity in the supporting member 36 and is brought into abutment against the supporting member 36 and the pre-molded glass 37. The lower mold part 47 is further moved upward to lift the supporting member 36 so that the supporting member 36 is brought into abutment against the molding surface (lower end surface) 51 of the upper mold part 50 (the surface along which the ejected glass 37 is formed). A pressure of 150 kg/cm$^2$ is applied to the ejected glass (pre-molded glass) 37 and is maintained for 20 seconds, thereby performing press molding. Subsequently, the shaft 43 is moved downward to move the lower mold part downward, and the mold release member provided around the outer circumferential surface of the upper mold part 50 is also moved downward to release the molded lens 42 from the upper molded part 50 and to place and recover the same on the placement portion, i.e., the extreme end portion of the transport arm 7, thereby completing the precision pressing step.

The transport arm 7 with the obtained molded lens 42 on the extreme end is operated to transport the molded lens 42 to the outside of the precision press chamber 6 through the opening 13, while the molded lens 42 is slowly cooled so that no crack is formed therein.

A lens was molded by the above-described molding process. The molded lens thereby obtained has a shape accuracy and optical characteristics such as to be capable of functioning suitably as an optical element of a camera or the like.

According to the embodiment using the arrangement and the process described above, the mold parts can be easily separated from the molded lens while the molded lens is supported on the supporting member without contacting the glass optical surfaces (functional surfaces) with any release member. Therefore, there is no possibility of an abrupt reduction in the temperature of the optical surface. Moreover, since the ejected glass (pre-molded glass) can be abruptly reheated from above and below while the lower mold part is separated, a step of successively pre-molding the molten glass is possible in a glass ejection step. Therefore, glass articles can be manufactured in a mass production manner with a small number of mold parts, and it is possible to mold a glass optical element with improved cost performance and productivity.

Coating of a material low in wettability has been described. However, the entire receiving mold part 30 and the entire upper and lower mold parts 50 and 47 may be formed by sintering a material selected from CrN, Cr$_2$O$_3$, TiN, c—BN, h—BN, w—BN, and AlN.

Figure 2:
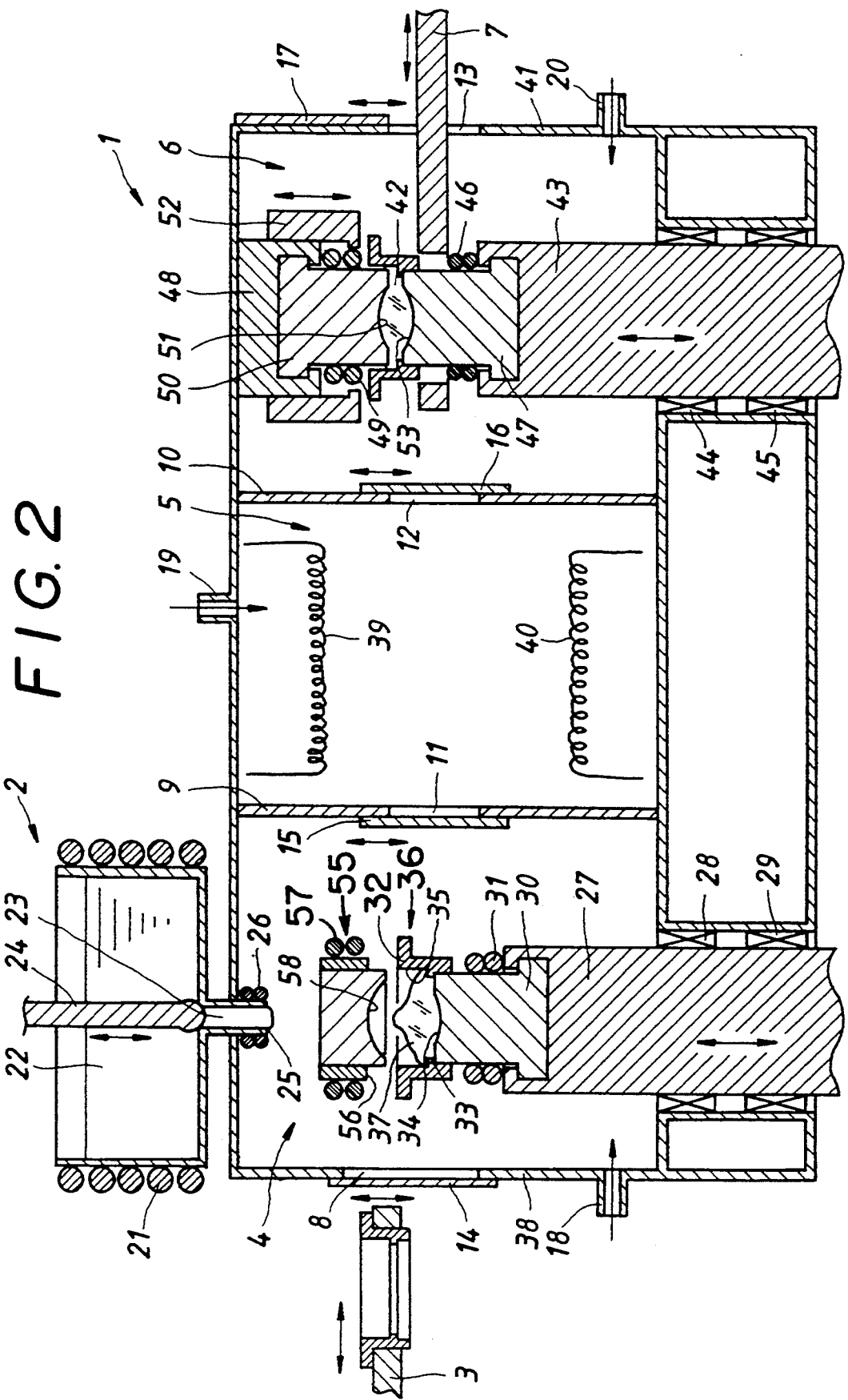
FIG. 2 is a schematic sectional side view of an apparatus for molding a glass optical element in accordance with a second embodiment of the present invention.

FIG. 2 is a schematic sectional side view of an apparatus for molding a glass optical element in accordance with the second embodiment of the present invention. In FIG. 2, components identical or corresponding to those of the first embodiment and components equal in shape and construction to those of the first embodiment are indicated by the same reference characters and will not again be described.

The arrangement of this embodiment differs from that of the first embodiment in that, as illustrated, an auxiliary pressing mold part 55 is disposed coaxially and vertically movably above a receiving mold part 30 for pre-molding, which is provided in a glass ejection chamber 4 for a pre-molding step in which molten glass is supplied, and that the auxiliary pressing mold part 55 is arranged so as to be able to laterally recede when molten glass 22 is ejected.

These different points will be described below in detail. As illustrated, the auxiliary pressing mold part 55 is disposed coaxially with the receiving mold part 30 so as to face a molding surface (upper end surface) 34 of the receiving mold part 30. The auxiliary pressing mold part 55 has a molding surface (lower end surface) 58 formed in conformity with a shape approximated to a finished shape of lens to be molded. This surface is coated with a thin film of a material, such as CrN, Cr$_2$O$_3$, TiN, c—BN, h—BN, w—BN, or AlN, low in wettability with respect to the molten glass 22, to prevent fuse-bonding with the molten glass 22. The auxiliary pressing mold part 55 may be formed by sintering a material selected from CrN, Cr$_2$O$_3$, TiN, c—BN, h—BN, w—BN, and AlN. An annular mold release member 56 is fitted around an outer circumferential surface of the cylindrical auxiliary pressing mold part 55. The mold release member 56 is arranged so as to be vertically movable along the outer circumferential surface of the mold part 55. A heater 57 for controlling the temperature of the auxiliary pressing mold part 55 at a predetermined temperature is wound around an outer circumferential surface of the mold release member 56.

Before a predetermined amount of molten glass 22 is ejected from a glass melting furnace 2 onto the receiving mold part 30 and a supporting member 36 through a nozzle 25, the auxiliary pressing mold part 55 recedes previously by a drive means (not shown). After the molten glass 22 has been ejected onto the supporting member 30 and the receiving mold part 30, the auxiliary pressing mold part 55 moves to a position above the receiving mold part 30 such as to be coaxial with the receiving mold part 30, and is moved onto an upper surface of the ejected molten glass 22 so that the molding surface 58 contact the surface of ejected glass 37, and presses the ejected glass to pre-mold the same into a predetermined shape. After the press molding, the auxiliary pressing mold part 55 is moved upward to return to the receding position again by moving laterally.

To ensure releasing of the pre-molded ejected glass from the auxiliary pressing mold part 55 during the upward movement of this mold part after the pre-molding, the mold release member 56 is moved downward along the circumferential surface of the auxiliary pressing mold part 55 so that its lower end portion is brought into abutment against an upper surface of a flange 32 of the supporting member 36 to separate the supporting member 36 from the auxiliary pressing mold part 55.

In the above-described arrangement, ejected glass 37 ejected onto the supporting member 36 and the receiving mold part 30 is pressed by the auxiliary pressing mold part 55 to spread out rapidly and to fittingly contact an inner circumferential surface of the supporting member 36.

As described above, the ejected glass 37 can be positively and rapidly supported in the supporting member 36 and can be smoothly released from the auxiliary pressing mold part 55. Therefore, the ejected glass 37 and the supporting member 36 can be transported into the reheating chamber 5 for the next step more speedily, and lens 42 can be continuously molded stably at an improved productivity.

FIGS. 3 and 4 show a molding machine in accordance with the third embodiment of the present invention. FIG. 3 is a longitudinal cross-sectional view of the molding machine, and FIG. 4 is a plan view of a supporting member 61 used in this embodiment.

This embodiment differs from the first embodiment in that a triangular prism is molded and that the supporting member 61, a receiving mold part 60, and upper and lower mold parts 63 and 64 different from those described above are therefore used.

The receiving mold part 60 has a molding surface having a V-shaped profile defined by two flat surfaces opened at an angle smaller than 90° As shown in FIG. 4, the supporting member 61 has a rectangular frame configuration, and has a pair of step portions 62 formed on its inner surfaces. Also, a flange 32 is formed at an outer peripheral side of the supporting member. The upper mold 63 has a flat molding surface worked precisely, while the lower mold 64 has a molding surface formed of two perpendicular flat surfaces worked precisely.

By the thus-constructed molding machine, a triangular prism 65 can be molded in accordance with the procedure described with respect to the first embodiment. Thus, the present invention can be applied to a molded article having an outside shape other than a circular shape.

The molding surface of each of the receiving mold parts 30 and 60 is formed as a surface approximated to the corresponding surface of the molded optical element having the finished shape. However, the molding surface may be formed so as to have the same shape as the finished shape. Preferably, if the finished shape surface of the optical element is a convex surface, the upper end surface 34 of the receiving mold part 30 is formed as a concave surface having a radius of curvature smaller than that of the convex surface.

If the finished shape surface of the optical element is a concave surface, the upper end surface 34 of the receiving mold part 30 is formed as a convex surface having a radius of curvature smaller than that of the concave surface.

If the radius of curvature is set in this manner, the molding surface of the lower mold part 47 or 64 is brought into contact with the glass from its central portion so that the glass and the molding surface can contact each other suitably closely. It is thereby possible to suitably transfer the shape of the molding surface.

It is apparent that, in this invention, a wide range of different working modes can be formed based on the invention without deviating from the spirit and scope of the invention. This invention is not restricted by its specific working modes except being limited by the appended claims.

What is claimed is:

1. A method of molding a glass optical element, comprising the steps of:
    placing a gob of molten glass from a glass melting furnace on a receiving mold part, the receiving mold part having an end surface for receiving the gob of molten glass from the glass melting furnace, the receiving mold part being engaged with a supporting member having a step portion for contacting with an outer peripheral surface of the receiving mold part;
    pre-molding the gob of molten glass by allowing the gob of molten glass to spread out in contact with the end surface to form a pre-molded glass preform;
    separating the receiving mold part and the supporting member while supporting the pre-molded glass preform on the supporting member;
    transporting the pre-molded glass preform supported on the supporting member to a heating furnace;
    heating in the heating furnace the pre-molded glass preform transported by the transport step while the pre-molded glass preform is supported on the supporting member;
    transporting the heated pre-molded glass preform to a position between a pair of mold parts while the heated pre-molded glass preform is supported on the supporting member;
    press-molding the heated pre-molded glass preform transported and supported on the supporting member by the pair of mold parts to form a molded optical element; and
    transporting the molded optical element from the position between the mold parts together with the supporting member.

2. A method of molding a glass optical element according to claim 1; wherein the end surface of the receiving mold part has a shape corresponding to an optical surface of the molded optical element; and the pre-molding step includes allowing the gob of molten glass to spread out in contact with the end surface to form the pre-molded glass preform having a bottom portion having the shape corresponding to the optical surface.

3. A method of molding a glass optical element according to claim 2; wherein the pre-molding step further includes allowing the gob of molten glass to spread out to contact an inner surface and the step portion of the supporting member.

4. A method of molding a glass optical element according to claim 3; wherein the pre-molding step further includes providing an auxiliary mold part having a molding surface in opposing facing relation with the end surface of the receiving mold part so as to dispose the gob of molten glass between the molding surface and the end surface, the molding surface having a shape corresponding to another optical surface of the molded optical element, and pressing the molding surface against the gob of molten glass so as to form the pre-molded glass preform having a top portion having the shape corresponding to said another optical surface.

5. A method of molding a glass optical element according to claim 4; further comprising transporting the molded optical element from the position between the pair of mold parts while supporting the molded optical element on the supporting member.

6. A method of molding a glass optical element according to claim 2; wherein the pre-molding step further includes providing an auxiliary mold part having a molding surface in opposing facing relation with the end surface of the receiving mold part so as to dispose the gob of molten glass between the molding surface and the end surface, the molding surface having a shape corresponding to another optical surface of the molded optical element, and pressing the molding surface against the gob of molten glass so as to form the pre-molded glass preform having a top portion having the shape of said another optical surface.

7. A method of molding a glass optical element according to claim 1; wherein the pre-molding step further includes providing an auxiliary mold part having a molding surface in opposing facing relation with the end surface of the receiving mold part so as to dispose the gob of molten glass between the molding surface and the end surface, the molding surface having a shape corresponding to an optical surface of the molded optical element, and pressing the molding surface against the gob of molten glass so as to form the pre-molded glass preform having a top portion having the shape corresponding to the optical surface.

8. A method of molding a glass optical element according to claim 7; further comprising transporting the molded optical element from the position between the pair of mold parts while supporting the molded optical element on the supporting member.

9. A method of molding a glass optical element according to claim 1; wherein the step of press-molding the heated pre-molded glass preform includes providing the pair of mold parts as a lower mold part and an upper mold part, and lifting the pre-molded glass preform and the supporting member by raising the lower mold part so that the pre-molded glass preform is pressed between the lower mold part and the upper mold part to form the molded optical element while being supported on the supporting member.

10. A method of molding a glass optical element, comprising the steps of: disposing a supporting member in contact with a receiving mold part, the receiving mold part having an end surface; placing a gob of molten glass on the end surface of the receiving mold part; pre-molding the gob of molten glass by allowing the gob of molten glass to spread out in contact with the end surface separating the receiving mold part from the supporting member to form a glass preform supported by the supporting member; heating the glass preform while supported on the supporting member; transporting the heated glass preform supported on the supporting member to a position between a pair of mold parts; and press-molding the heated glass preform supported on the supporting member by the pair of mold parts to form a molded optical element.

11. A method of molding a glass optical element according to claim 10; further comprising the step of transporting the glass preform supported on the supporting member from the receiving mold part to a heating furnace before the step of heating the glass preform.

12. A method of molding a glass optical element according to claim 10; wherein the end surface of the receiving mold part has a shape corresponding to an optical surface of the molded optical element; and the step of pre-molding the gob of molten glass includes allowing the gob of molten glass to spread out in contact with the end surface to form the glass preform having a bottom portion having the shape corresponding to the optical surface.

13. A method of molding a glass optical element according to claim 12; wherein the supporting member has an inner surface and a step portion, the step portion being for contacting a peripheral surface of the receiving mold part; and the step of pre-molding the gob of molten glass further includes allowing the gob of molten glass to spread out to contact the inner surface and the step portion of the supporting member so as to form the glass preform supported by the supporting member.

14. A method of molding a glass optical element according to claim 13; wherein the step of pre-molding the gob of molten glass further includes providing an auxiliary mold part having a molding surface in opposing facing relation with the end surface of the receiving mold part so as to dispose the gob of molten glass between the molding surface and the end surface, the molding surface having a shape corresponding to another optical surface of the molded optical element, and pressing the molding surface against the gob of molten glass so as to form the glass preform having a top portion having the shape corresponding to said another optical surface.

15. A method of molding a glass optical element according to claim 10; further comprising a step of transporting the molded optical element from the position between the pair of mold parts while supporting the molded optical element on the supporting member.

16. A method of molding a glass optical element according to claim 10; wherein the step of press-molding the heated glass preform includes providing the pair of mold parts as a lower mold part and an upper mold part, and lifting the glass preform and the supporting member by raising the lower mold part so that the glass preform is pressed between the lower mold part and the upper mold part to form the molded optical element while being supported on the supporting member.

17. A method of molding a glass optical element according to claim 16; wherein the supporting member has an inner surface and a step portion, the step portion being for contacting a peripheral surface of the receiving mold part; and the step of pre-molding the gob of molten glass includes allowing the gob of molten glass to spread out to contact the inner surface and the step portion of the supporting member so as to form the glass preform supported by the supporting member.

18. A method of molding a glass optical element according to claim 10; wherein the supporting member has an inner surface and a step portion, the step portion being for contacting a peripheral surface of the receiving mold part; and the step of pre-molding the gob of molten glass includes allowing the gob of molten glass to spread out to contact the inner surface and the step portion of the supporting member so as to form the glass preform supported by the supporting member.

19. A method of molding a glass optical element according to claim 10; wherein the step of pre-molding the gob of molten glass includes providing an auxiliary mold part having a molding surface in opposing facing relation with the end surface of the receiving mold part so as to dispose the gob of molten glass between the molding surface and the end surface, the molding surface having a shape corresponding to an optical surface of the molded optical element, and pressing the molding surface against the gob of molten glass so as to form the glass preform having a top portion having the shape corresponding to the optical surface.

* * * * *